US006871671B2

(12) United States Patent
Weber

(10) Patent No.: US 6,871,671 B2
(45) Date of Patent: Mar. 29, 2005

(54) HYDROACCUMULATOR

(75) Inventor: Norbert Weber, Sulzbach (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 0 days.

(21) Appl. No.: 10/624,895

(22) Filed: Jul. 23, 2003

(65) Prior Publication Data

US 2004/0123912 A1 Jul. 1, 2004

(30) Foreign Application Priority Data

Jul. 24, 2002 (DE) ........................................ 102 33 454

(51) Int. Cl.[7] ................................................ F16L 55/04

(52) U.S. Cl. .......................... 138/30; 138/26; 220/721; 220/530

(58) Field of Search ............................ 138/30, 26, 31; 220/721, 530, 4.12, 581

(56) References Cited

U.S. PATENT DOCUMENTS 3,033,552 A * 5/1962 Ogden ........................ 267/120
3,165,229 A * 1/1965 Paul ........................... 220/721
3,524,475 A * 8/1970 Kirk, Jr. ...................... 138/30
4,305,428 A * 12/1981 Burton ........................ 138/30
4,474,215 A * 10/1984 Richter et al. ................ 138/30
5,176,178 A * 1/1993 Schurter et al. .............. 138/30
5,386,925 A * 2/1995 Lane .......................... 220/530

FOREIGN PATENT DOCUMENTS

EP 0078721 4/1985

* cited by examiner

*Primary Examiner*—Patrick Brinson
(74) *Attorney, Agent, or Firm*—Roylance, Abrams, Berdo & Goodman L.L.P.

(57) ABSTRACT

A hydroaccumulator, especially a membrane accumulator, has an accumulator housing with two housing parts and a separating element in the housing. The separating element can be a separating membrane dividing the accumulator housing into a gas chamber and a fluid chamber. The gas chamber is connected to carry gas to and from gas refiller through a connection. The gas refiller is formed from an additional housing part connected to the accumulator housing to form a unit. The connection is at least one connecting opening in the accumulator housing connecting the interior of the additional housing part to the gas chamber. Additional gas accumulator volume is provided without otherwise conventional pipework to save money and installation space and avoid conventional leaks which occur in the area of the pipework.

27 Claims, 2 Drawing Sheets

HYDROACCUMULATOR

FIELD OF THE INVENTION

The present invention relates to a hydrocccumulator, especially a membrane accumulator, with an accumulator housing. The housing has at least one or more, especially two housing parts, and a separating element which is located therein, especially in the form of a separating membrane. The separating membrane divides the accumulator housing into a gas chamber and a fluid chamber. The gas chamber is connected to carry gas to the gas refilling means by way of a connecting means.

BACKGROUND OF THE INVENTION

Hydroaccumulators with separating elements are used preferably in hydraulic systems, among others for energy storage, for emergency actuation of overall hydraulic systems, shock absorption, etc. The hydroaccumulators are by definition considered pressure vessels, by a certain useful volume being storable depending on the application. Ordinarily hydroaccumulators with a separating element are differentiated into bladder accumulators, membrane accumulators and piston accumulators, the manner of action being based on the compressibility of the working gas used for fluid storage. Generally nitrogen is used as the working gas. The separating element divides hydropneumatic accumulators into a gas part and into a liquid part, the latter being connected to the hydraulic circuit. When the pressure on the fluid side rises, the gas on the gas side is compressed in the gas chamber. When the pressure drops on the fluid side, the compressed gas can expand and displace the stored liquid in the accumulator back into the hydraulic circuit.

Since the separating element in the form of a membrane of elastomer material is generally subject to a certain gas permeability, especially with longer use of the hydroaccumulator, the working gas can diffuse through the separating membrane onto the fluid side of the accumulator and be lost. The working capacity of the hydroaccumulator then continuously decreases. To counteract this loss of working capacity in bladder accumulators, the gas side of the accumulator is designed especially for the connection of pressure vessels. Through a pipework as the connection, the gas side of the hydraulic bladder accumulator is permanently connected to carry gas to the pressure vessel which is then used as a gas refilling means for the respective working gas, preferably in the form of nitrogen. Fundamentally, gas is not actually rerouted into the hydroaccumulator through the gas refilling means. Rather, the gas volume is added by the addition of the volume of the gas chamber in the accumulator and of the gas chamber in the pressure accumulator so that partial gas losses by diffusion through the separating membrane become less important relative to the total volume of the stored working gas. The service life of the hydraulic bladder accumulator can then be prolonged. Moreover, the pressure rise at the same displaced liquid volume is less.

In practice, the approaches made in this respect, as a result of the separate arrangement of the hydroaccumulator and the pressure vessel as the gas refilling means, require a large amount of installation space. The existing pipework as the connecting means between the containers generally has leaks. Inherently, the advantage desired by the additional gas refilling means is at least in part lost again by the leaks. Furthermore, the pipework can only be produced as a permanently gas-carrying connecting means between the containers so that not only do production costs arise due to the pipework itself, but other costs due to installation efforts also arise.

This bladder accumulator with permanently connected gas refilling means has the separating membrane made as a gas bladder. The bladder is filled by a gas valve located on the top part of the hydroaccumulator and connected as part of the connecting means opened to the pipework, and accordingly to the gas refilling means. As a result of the large volume pressure vessel used as the gas refilling means, this configuration has generally only been used in large-volume hydroaccumulators, such as bladder accumulators, or in piston accumulators in which the separating element is a sealed separating piston movable within the accumulator housing. In the piston accumulator, the diffusion of gas toward the fluid side takes place through the sealing means on the outside periphery of the separating piston which slides along the inner peripheral side of the hydroaccumulator housing for the working process of the accumulator.

SUMMARY OF THE INVENTION

Objects of the present invention are to provide an improved, hydroaccumulator gas refilling system that can also be used for membrane accumulators in an economical and reliable manner, that requires little installation space and that is favorable in production, installation and maintenance.

The foregoing objects are obtained by a gas refilling means formed from at least one additional housing part connected to the accumulator housing to form a single unit. The connecting means has at least one connecting opening in the accumulator housing, connecting the interior of the additional housing part to the gas chamber. The gas refilling means, in the form of an additional housing part of the accumulator, is seated on the actual accumulator housing with the gas chamber and the fluid chamber. By the direct connecting means between the gas chamber of the accumulator housing and the interior of the additional housing part used with its inside volume holding the working gas, the conventional pipework is avoided. This avoidance saves money and installation space for the overall hydroaccumulator supplemented in this way. Since, by eliminating the pipework, leaks can no longer occur in the area of the connecting points between the pipework and the accumulator and gas tank as the gas refilling means. In the present invention, the pertinent problem is avoided and over the longer service life of the hydroaccumulator, except for gas losses by way of diffusion processes on the separating element, especially in the form of a separating membrane, loss of the working gas for operation of the accumulator, especially in the form of nitrogen gas, does not occur. This implementation prevents the movement of the membrane from being inhibited at pressure peaks. Overstretching in the gas chamber which damages the membrane cannot occur.

In one preferred embodiment of the hydroaccumulator of the present invention, the additional housing part is on the side of the outer periphery of the housing part of the accumulator housing bordering the gas chamber of the accumulator. Preferably, the housing part, which at least borders the fluid chamber forms, on its free edge facing gas chamber housing part, a shoulder on which the free end of the additional housing part can be seated. In this way during installation, the additional housing part can be easily placed on the actual accumulator housing of the hydroaccumulator and can be connected to it. Fundamentally, in one working process with three housing parts, the accumulator of the present invention can be accomplished.

In another especially preferred embodiment of the hydroaccumulator of the present invention, all three housing parts are connected to one another on their face ends by a common connecting point, preferably in the form of a weld. The weld can be formed by a laser process or the like as well. In this way, overall installation of the hydroaccumulator can be economically achieved in one cycle.

In one embodiment of the hydroaccumulator of the present invention, the separating element is an elastomer material held by a mounting ring leaving the connecting point free on the inner peripheral side on the accumulator housing. In this case, in another advantageous embodiment, one housing part, having at least in part the gas chamber, has a step-shaped shoulder on its free mounting edge that can cover the connecting point towards the inside. This arrangement prevents possible hot weld materials or weld splashes from being able to penetrate into the interior of the hydroaccumulator to damage the separating membrane. Rather, the weld ends on the inner peripheral side on the step-shaped shoulder of that one housing part.

In one alternative embodiment, the pertinent cover point could also be formed by the top end of the mounting ring.

In one especially preferred embodiment of the hydroaccumulator of the present invention, the volumetric capacity of the additional housing part is approximately twice as large as the accumulator volume of the accumulator housing on the gas side. The pertinent configuration with these volumetric ratios has proven especially effective for membrane accumulators and allows a distinct prolongation of the service life of the accumulator by the downstream addition of nitrogen. Surprisingly to one skilled in the art in the field of hydroaccumulators, the wall thickness of the additional housing part used for the nitrogen addition can be reduced compared with the wall thickness of the other two accumulator housing parts. Especially it can be made approximately half as large, without this leading to adverse effects on safety for the accumulator. In particular, the arrangement of the present invention can be made such that the free mobility of the membrane is accordingly limited and cannot emerge onto the gas side of the additional accumulator housing.

If the separating element, by preference, is provided with a stop part with which the fluid connection of the accumulator housing can be closed, when the fluid is completely removed from the accumulator housing, the separating element cannot be sucked by way of the fluid connection in the direction of the hydraulic circuit. This action would lead to damage to the membrane material.

Advantageously, all the housing parts are made cylindrical in the area of their connection and have at least partially arched termination sides on their end sides. The pertinent configuration has proven favorable with respect to the compressive forces applied to the accumulator housing. The hydroaccumulator is accordingly designed to be reliable.

Since the gas refilling means can be made very compact, it is now easily possible to use a gas refilling means for conventional membrane accumulators. This use was not the case in the past, since due to the large-volume pressure accumulator as the gas refilling means, these arrangements with pipework were used only for bladder or piston accumulators.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
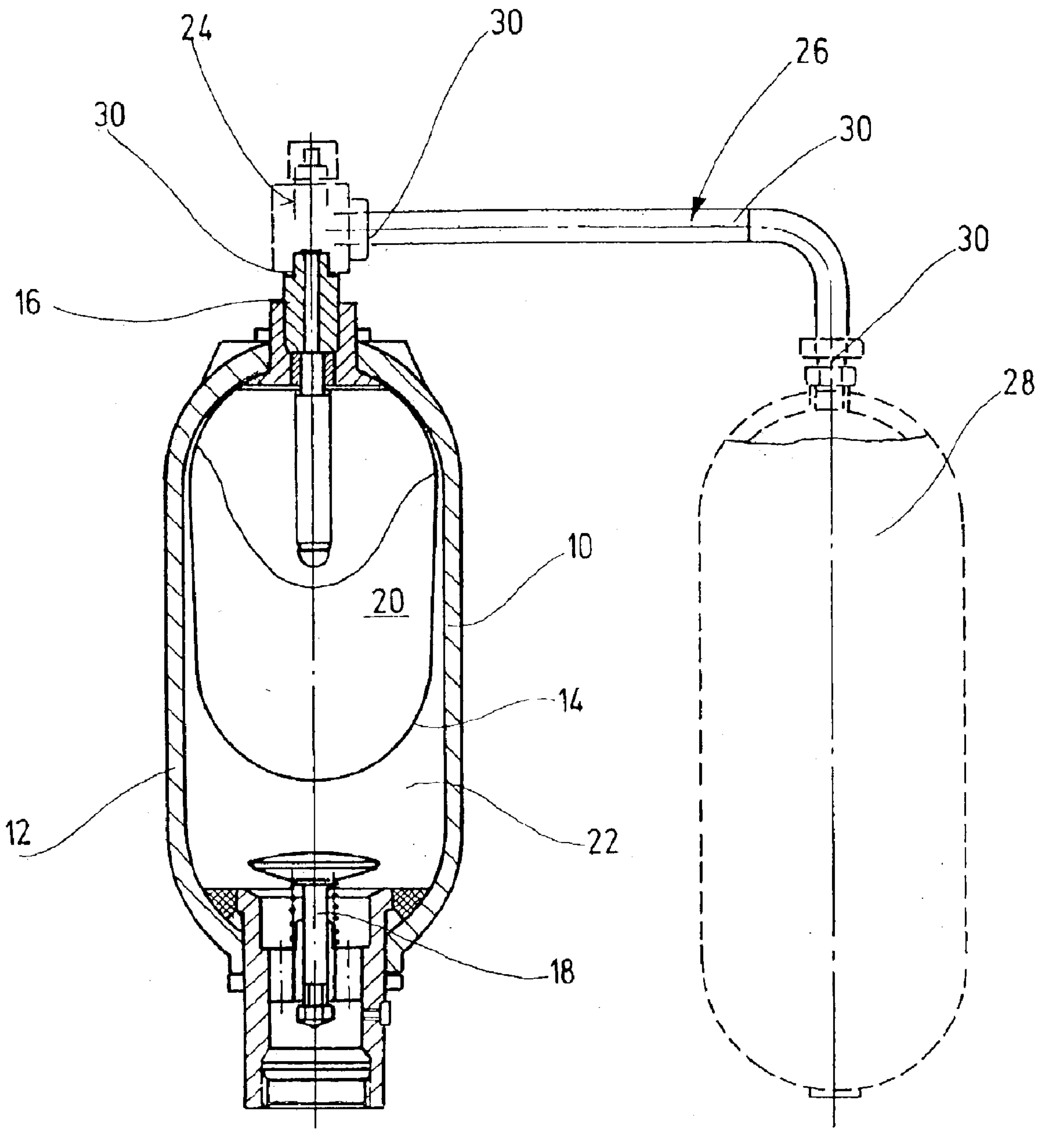
Fig.1 (PRIOR ART)
FIG. 1 is a side elevational view partially in section and partially in projection of a conventional gas refilling means having a bladder accumulator and a pressure vessel.

FIG. 1 shows, in the direction of looking at its left side, a hydroaccumulator in the form of a bladder accumulator. The bladder accumulator has an accumulator housing 10 having a continuous first housing part 12. In the accumulator housing 10, a separating element 14 is routed in the form of a bladder of rubber-elastic material (elastomer). The bladder is filled through the gas connecting part 16 located on the top part of the accumulator housing 10. The liquid valve 18, attached to the bottom end of the hydroaccumulator when viewed as illustrated, is a disk valve means preventing the bladder from being sucked out when the fluid discharges. The valve means is reset in the conventional manner by a corresponding compression spring which is not described in detail. The separating element 14 divides the accumulator housing 10 into a gas chamber 20 and a fluid chamber 22.

On its top, the conventional accumulator is provided with an adapter 24 establishing the connection between the gas chamber 20 through the gas connecting part 16 to the pipework 26 in the form of individual pipe sections. The pipework 26 discharges at one free end on the adapter and at its other free end on a pressure vessel 28 forming the gas refilling means. If at this point, as a result of the elastomer accumulator bladder, gas losses occur in the gas chamber 20 of the accumulator housing 10, due to diffusion processes of the working gas generally in the form of nitrogen through the separating element 14 in the direction to the fluid chamber side 22 of the accumulator, the pertinent losses of working gas by way of the increasingly available volume within the pressure vessel 28 at least over a definable time interval are equalized. The pressure vessel is likewise filled with pressurized working gas and undertakes refilling by way of the pipework 26.

Even if the pipework 26 is carefully attached, gas losses cannot be precluded especially at the connection sites 30 due to sealing problems. The gas loss is induced on the side of the accumulator bladder, and by the gas refilling means in the form of a pressure vessel 28 with the pipework 26 and the adapter 24. A further leak arises due to the connecting site 30 between the adapter 24 and the outlet side of the gas connecting part 16. Furthermore, FIG. 1 clearly shows that the conventional approach is structurally large and due to the diversity of parts (adapter, pipework, separate pressure vessel, etc.) both production and also later maintenance are costly.

Figure 2:
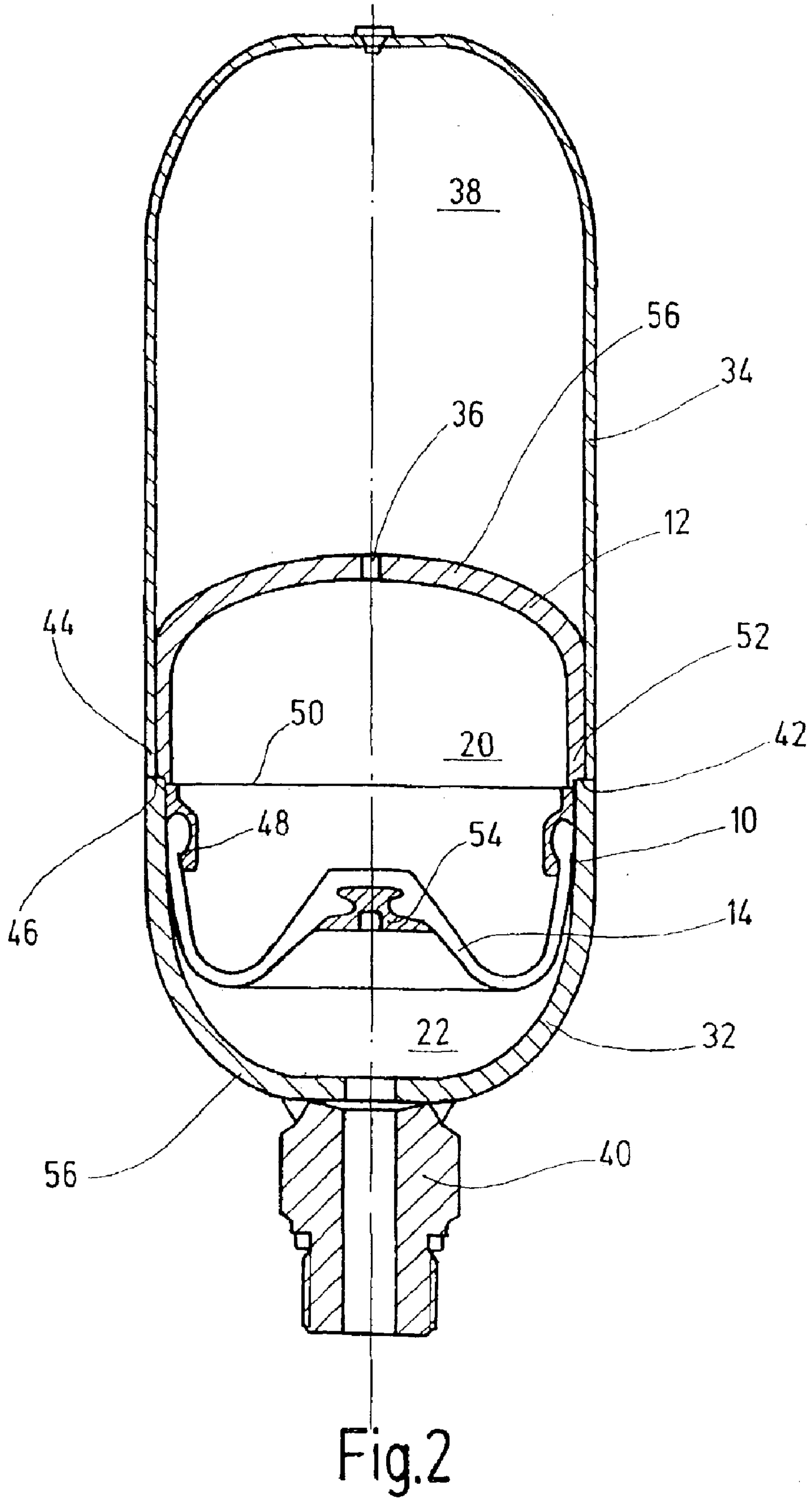
FIG. 2 is a side elevational view in section of a hydroaccumulator according to one embodiment of the present invention.

In the present invention shown in FIG. 2, the above described disadvantages in the prior art are reliably avoided. The hydroaccumulator of the present invention is illustrated in the form of a membrane accumulator. The separating membrane or element 14 is in the shape of a W in cross section in the initial state shown in FIG. 2. The accumulator has an accumulator housing 10 with a first housing part 12 and a second housing part 32. The separating element 14, in the form of the W-shaped separating membrane, divides the accumulator housing 10 in turn into a gas chamber 20 and a fluid or liquid chamber 22. The gas chamber 20 is connected to carry gas to the gas refilling means by way of a connecting means. The gas refilling means is a chamber in a third or additional housing part 34 connected to the accumulator housing 10 to form a compact unit. The connecting means is at least one connecting opening 36 in the accumulator housing 10 connecting the interior 38 of the third housing part 34 to the gas chamber 20 of the hydroaccumulator. In addition to the illustrated connecting opening 36, several passages can be provided which are smaller in diameter in the assigned housing part.

As seen from FIG. 2, the third housing part 34 comprises one housing part of the accumulator housing 10 on the outer peripheral side of first housing part 12. In the initial state of the accumulator, parts 12 and 34 define the respective portions of the gas chamber 20. The gas fill volume between the first housing part 12 and the top of the separating element 14 is enclosed.

The second housing part 32 borders the fluid chamber 22, and enables accommodation of the fluid of a hydraulic circuit connected at the fluid connection 40. The fluid chamber can vary in exactly the same manner as the volume of the gas chamber 20. Depending on the pressure ratios within the accumulator housing 10 and the accommodated amounts of fluid, the separating element 14 can move between the inside of the second housing part 32 and the corresponding inside of the first housing part 12, specifically between the connecting point for the fluid connection 40 and the connecting opening 36.

The second housing part 32, on its free edge facing the first housing part 12, forms a shoulder 42 on which the free ends of the first housing part 12 and of the third housing part 34 can be seated. Since all housing parts 12, 32, and 34 are consequently in contact at their facing ends along the common edge line 44, and connected by a common connecting point 46, preferably in the form of a connecting weld (not shown), assembly at the entire hydroaccumulator can be accomplished. The separating element 14, in the form of the separating membrane has an end widened in the manner of a bead, and guided in the mounting ring 48. The mounting ring free end surface 50, viewed in the line of sight to FIG. 2, lies underneath the edge line 44. If the top edge of the mounting ring 48 is pulled further up, in an embodiment which is not further shown, the mounting ring top edge can cover the connecting point 46 in the form of a weld on the inside. In this way, possible weld splashes or the like inside are prevented from damaging the sensitive separating membrane. In this embodiment, however, first housing part 12 encompasses at least partially the gas chamber 20 and covers, with a step-shaped shoulder 52, on its free mounting edge against the connecting point 46. In this way, the same weld splash protection is obtained. By shoulder 52, inner centering of the first housing part 12 is obtained, this facilitating seating and assembly of the hydroaccumulator.

In particular, the volumetric capacity of the third housing part 34 is approximately twice the accumulator volume of the accumulator housing 10 on its gas side. One computation example for prolonging the operating lifetime by nitrogen addition is as follows. For the case of the illustrated membrane accumulator, let the initial pressure be $p_o$=10 bar at a gas volume in the gas chamber 20 of $V_o$=0.5 l; this corresponds to a gas volume of 5 Nl (standard liters). The gas loss over a definable time interval x will be 2 Nl. Thus, the difference is 5 Nl−2 Nl=3 Nl. The gas pressure is 3 Nl/0.5 l=6 bar after the time interval x. The pressure loss by the indicated gas loss of 2 Nl is then 4 bar after the time interval x.

For the case in which the membrane accumulator is provided with nitrogen addition, for an initial pressure of $p_o$=10 bar, the initial gas volume $V_o$ is 1 l, compared to the preceding example of 0.5 l, and is applied by the gas volume of the third housing part 34 with its interior. This addition yields a gas volume of a total of 10 Nl. The gas loss over the definable time interval x should again be 2 Nl, yielding a pressure loss of 2 bar after time x. 10 Nl−2 Nl yields 8 Nl, yielding a gas pressure of 8/1=8 bar after time x. This working example clearly shows that the service lives of the pertinent membrane accumulators can be greatly increased by a gas refilling which is an integral component of the membrane hydroaccumulator.

As FIG. 2 also shows, the wall thickness of the third housing part 34, compared to the wall thickness of the two other housing parts 12 and 32, can be greatly reduced. In particular, third housing part 34 can be made only half as thick as the housing walls of the accumulator housing 10.

The separating element 14 is provided with a bottom-side stop part 54. This stop part is conventional in such hydroaccumulators, and thus, not described in detail. The stop part 54 is used to prevent the elastic separating element 14 from being pulled out by way of the fluid connection 40 when the accumulator has been emptied on the fluid side to avoid permanent damage to the sensitive membrane material. By the stop part 54, a defined closing of the fluid connection 40, without the described disadvantage, is possible. A function is assigned to the stop part 54 comparable to the already described disk valve means 18 in the initially described bladder accumulator.

All the housing parts 12, 32, 34 are made cylindrical in the area of their connection, i.e., in the area of the connecting point 46. Their opposite end sides have at least in part arched terminating sides 56. This shape is favorable, especially within the accumulator housing 10, to the extent that the separating element 14 can then be carefully supported in the maximum end positions on the housing parts of the accumulator housing 10, without overstressing of the sensitive membrane material.

The accumulator of the present invention is characterized, as shown, by a prolonged service life. Gas losses by diffusion by way of the separating membrane can be equalized by the gas refilling means in the form of the additional or third housing part 34. Due to the increased downstream gas volume, the pressure rise is less at the same displaced oil volume, compared to other standard accumulators. The overall accumulator, which is completed as a unit, can be implemented in the manner of a modular kit with standard components. With only three housing parts and one connecting seam, the hydroaccumulator with its working spaces is completed. The gas refilling means, which can be seated on the actual accumulator, yields a space-saving structure with few components without the need for complex pipework which cannot be made gas tight. This arrangement likewise reduces the production and installation costs, as well as the maintenance costs of the approach, as in the present invention.

While one embodiment has been chosen to illustrate the invention, it will be understood by those skilled in the art that various changes and modifications can be made therein without departing from the scope of the invention as defined in the appended claims.

What is claimed is:

1. A hydroaccumulator, comprising:

an accumulator housing having first and second housing parts;

a separating element located in and dividing said accumulator housing into a gas chamber and a fluid chamber;

a gas refilling chamber formed by at least one additional housing part connected with and forming a unit with the accumulator housing, said additional housing part overlapping an outer lateral peripheral side of said first housing part of said accumulator housing defining said gas chamber; and at least one connecting opening in said accumulator housing connecting said gas refilling chamber to said gas chamber.

2. A hydroaccumulator according to claim 1 wherein said separating element is a separating membrane.

3. A hydroaccumulator according to claim 1 wherein said second housing part defines said fluid chamber, and comprises a shoulder on a free edge facing said first housing part, a free end of said additional housing part being seated on said shoulder.

4. A hydroaccumulator according to claim 1 wherein said first, second and additional housing parts are connected to one another at free ends thereof by a common connecting point.

5. A hydroaccumulator according to claim 4 wherein said common connecting point is a weld.

6. A hydroaccumulator according to claim 4 wherein said separating element is a separating membrane of elastomeric material held by a mounting ring leaving said connecting point free on an inner peripheral side of said accumulator housing.

7. A hydroaccumulator according to claim 4 wherein said first housing part defines said gas chamber and comprises a step-shaped shoulder on said free end thereof covering said connecting point.

8. A hydroaccumulator according to claim 1 wherein said additional housing part comprises a volume approximately twice a volume of said gas chamber of said accumulator housing.

9. A hydroaccumulator according to claim 1 wherein said additional housing part has a wall thickness approximate one-half as thick as the wall thickness of said first and second housing parts.

10. A hydroaccumulator according to claim 1 wherein said additional housing part has a wall thickness substantially less than wall thickness of said first and second housing parts.

11. A hydroaccumulator according to claim 1 wherein said accumulator housing comprises a fluid connection; and said separating element comprises a stop part for closing said fluid connection.

12. A hydroaccumulator according to claim 1 wherein said first, second and additional housing parts are substantially cylindrical in an area of connection thereof, and comprise at least partially arched termination sides on ends thereof remote from said connection.

13. A hydroaccumulator, comprising:

an accumulator housing having first and second housing parts, said second housing part defining a fluid chamber and including a shoulder on a free edge facing said first housing part;

a separating element located in and dividing said accumulator housing into a gas chamber and said fluid chamber;

a gas refilling chamber formed by at least one additional housing part connected with and forming a unit with the accumulator housing, a free end of said additional housing part being seated on said shoulder; and at least one connecting opening in said accumulator housing connecting said gas refilling chamber to said gas chamber.

14. A hydroaccumulator according to claim 13 wherein said first, second and additional housing parts are connected to one another at free ends thereof by a common connecting point.

15. A hydroaccumulator according to claim 14 herein said separating element is a separating membrane of elastomeric material held by a mounting ring leaving said connecting point free on an inner peripheral side of said accumulator housing.

16. A hydroaccumulator according to claim 14 wherein said first housing part defines said gas chamber and comprises a step-shaped shoulder on said free end thereof covering said connecting point.

17. A hydroaccumulator according to claim 13 wherein said additional housing part comprises a volume approximately twice a volume of said gas chamber of said accumulator housing.

18. A hydroaccumulator according to claim 13 wherein said additional housing part has a wall thickness substantially less than wall thickness of said first and second housing parts.

19. A hydroaccumulator, comprising:

an accumulator housing having first and second housing parts;

a separating element located in and dividing said accumulator housing into a gas chamber and a fluid chamber, said separating element being a separating membrane of elastomeric material;

a gas refilling chamber formed by at least one additional housing part connected with and forming a unit with the accumulator housing;

at least one connecting opening in said accumulator housing connecting said gas refilling chamber to said gas chamber;

free ends of said first, second and additional housing parts connected to one another by a common connecting point; and a mounting ring holding said separating membrane and leaving said connecting point free on an inner peripheral side of said accumulator housing.

20. A hydroaccumulator according to claim 19 wherein said common connecting point is a weld.

21. A hydroaccumulator according to claim 19 wherein said first housing part defines said gas chamber and comprises a step-shaped shoulder on said free end thereof covering said connecting point.

22. A hydroaccumulator according to claim 19 wherein said additional housing part comprises a volume approximately twice a volume of said gas chamber of said accumulator housing.

23. A hydroaccumulator according to claim 19 wherein said additional housing part has a wall thickness substantially less than wall thickness of said first and second housing parts.

24. A hydroaccumulator, comprising:

an accumulator housing having first and second housing parts;

a separating element located in and dividing said accumulator housing into a gas chamber and a fluid chamber;

a gas refilling chamber formed by at least one additional housing part connected with and forming a unit with the accumulator housing;

at least one connecting opening in said accumulator housing connecting said gas refilling chamber to said gas chamber;

free ends of said first, second and additional housing parts connected to one another by a common connecting point, said first housing part defining said gas chamber and including a step-shaped shoulder on said free end thereof covering said connecting point.

25. A hydroaccumulator according to claim 24 wherein said common connecting point is a weld.

26. A hydroaccumulator according to claim 24 wherein said additional housing part comprises a volume approximately twice a volume of said gas chamber of said accumulator housing.

27. A hydroaccumulator according to claim 24 wherein said additional housing part has a wall thickness substantially less than wall thickness of said first and second housing parts.

* * * * *